Patented May 23, 1944

2,349,267

UNITED STATES PATENT OFFICE 2,349,267

ACYLATED DERIVATIVE OF VITAMIN B$_6$ AND PROCESS OF PREPARING THE SAME

Stanton A. Harris, Westfield, N. J., and Eric T. Stiller, New York, N. Y., assignors to Merck & Co., Inc, Rahway, N. J., a corporation of New Jersey No Drawing. Application November 2, 1940, Serial No. 364,030

8 Claims. (Cl. 260—297.5)

This invention relates to acylated derivatives of vitamin B$_6$, and to processes of preparing the same, and more particularly to the hydrohalides of 2 - methyl - 3 - acetoxy-4,5-bis(acetoxymethyl)pyridine, 2-methyl-3-hydroxy-4,5-bis(acetoxymethyl)pyridine and its hydrohalide salts.

Fully acetylated vitamin B$_6$ has been prepared by treating vitamin B$_6$ with acetic anhydride in pyridine. However, in the purification of the crude reaction product, high vacuum distillation is necessary.

We have discovered that the hydrohalide salts of fully acetylated vitamin B$_6$ can be easily obtained and purified by recrystallization, and that high vacuum distillation is not necessary.

Heretofore, no partially acetylated derivatives of vitamin B$_6$, having a free hydroxyl group, have been known. We have discovered that 2-methyl-3-hydroxy-4,5-bis(acetoxymethyl)pyridine can be obtained by reacting 2-methyl-3-hydroxy-4,5-bis(halogenmethyl)pyridine hydrohalide with silver acetate. The hydrohalide salt of the latter base may be obtained by treating a solution of the said base with a hydrohalide.

The new compounds of the present invention all show biological activity equivalent to that of vitamin B$_6$.

Example I

One gm. of vitamin B$_6$ hydrochloride is dissolved in a mixture of 20 cc. of dry pyridine and 20 cc. of acetic anhydride. Solution takes place slowly with a slight evolution of heat. After standing over night, the mixture is heated for fifteen minutes on a steam bath, and then concentrated to dryness under reduced pressure. The residue is shaken with ether, decanted, and upon the addition of dry hydrochloride to the ether solution immediate crystallization of the hydrochloride of 2 - methyl - 3 - acetoxy-4,5-bis-(acetoxymethyl) pyridine takes place. After two recrystallizations from absolute alcohol, the hydrochloride has a melting point of 156–158° C., and gives no color test with ferric chloride. Other hydrohalide salts may be obtained by treating the ether solution with different hydrohalides, for example, hydrogen bromide, etc.

Example II 150 mgs. of 2-methyl-3-hydroxy-4,5-bis(bromomethyl) pyridine hydrobromide is dissolved in 20 cc. of glacial acetic acid containing 23% of potassium acetate and 0.3 gm. of silver acetate, and the mixture is refluxed for 3½ hours. The silver bromide is filtered off, the filtrate taken to dryness and extracted five times with ether. After evaporation to dryness, the residue is taken up in warm ether, filtered and again evaporated. On standing, 2-methyl-3-hydroxy-4,5-bis(acetoxymethyl)pyridine crystallizes out. Yield, 93–96 mgs., theory 101 mgs. It sublimes at 100–105/10$^{-4}$ mm. pressure in colorless crystals; melting point 100–102° C.

Example III 3.76 gms. of 2-methyl-3-hydroxy-4,5-bis(bromomethyl)pyridine hydrobromide is treated with three equivalents (5 gms.) of silver acetate in 50 cc. of 22% potassium acetate in glacial acetic acid. The mixture is heated on the steam bath 1½ hours, filtered, concentrated under vacuum, and crystallization takes place. The crystals are washed with acetone, which is then evaporated to dryness. The residue is taken up in ether, and treated with dry hydrogen chloride. An oily precipitate is obtained, which crystallizes from absolute alcohol. The hydrochloride of 2-methyl - 3 - hydroxy-4,5-bis(acetoxymethyl)pyridine melts at 160–161° C., and gives a positive ferric chloride test. Other hydrohalide salts may be obtained by treating the ether solution with different hydrohalides, for example, hydrogen bromide.

In the above examples, organic solvents (such as benzene, acetone, etc.), in which the hydrohalide is insoluble, may be employed in place of the ether, and when ether is mentioned in the appended claims, it is meant to include such organic solvents.

The above examples have been given by way of illustration and not of limitation, and modifications may be made in carrying out the present invention without departing from the spirit and scope thereof, and we are to be limited only by the appended claims.

We claim:

1. A compound selected from the group consisting of 2 - methyl-3-hydroxy-4,5-bis(acetoxymethyl)pyridine, and the hydrohalide salts thereof.

2. 2 - methyl-3-hydroxy-4,5-bis(acetoxymethyl)pyridine.

3. A hydrohalide of 2-methyl-3-hydroxy-4,5-bis(acetoxymethyl)pyridine.

4. The hydrochloride of 2-methyl-3-hydroxy-4,5-bis(acetoxymethyl)pyridine.

5. The process comprising reacting 2-methyl-3-hydroxy-4,5-bis(bromomethyl)pyridine hydrobromide with silver acetate in the presence of glacial acetic acid, removing the solvent by evaporation, extracting the reaction product with ether, and treating the ether solution with hydrogen chloride.

6. The process that comprises reacting 2-methyl-3-hydroxy-4:5-bis(bromo-methyl)pyridine hydrobromide with silver acetate in glacial acetic acid.

7. The process that comprises reacting a 2-methyl-3-hydroxy-4:5-bis(halogen-methyl)pyridine hydrohalide with silver acetate in glacial acetic acid.

8. The process comprising reacting a 2-methyl-3-hydroxy-4:5-bis(halogen-methyl)pyridine hydrohalide with silver acetate in the presence of glacial acetic acid, removing the solvent by evaporation, extracting the reaction product with ether, and treating the ether solution with a hydrohalic acid.

STANTON A. HARRIS.
ERIC T. STILLER.